March 24, 1942.  W. J. KNOCHEL  2,277,440
GLASS-METAL CASING
Filed Jan. 10, 1941
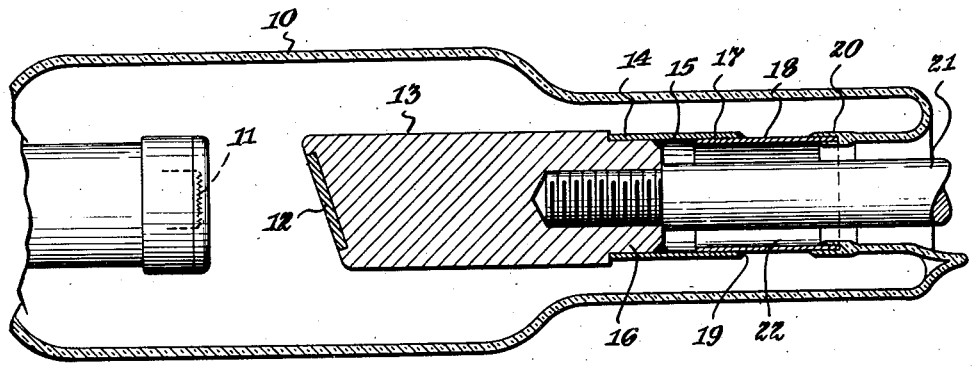
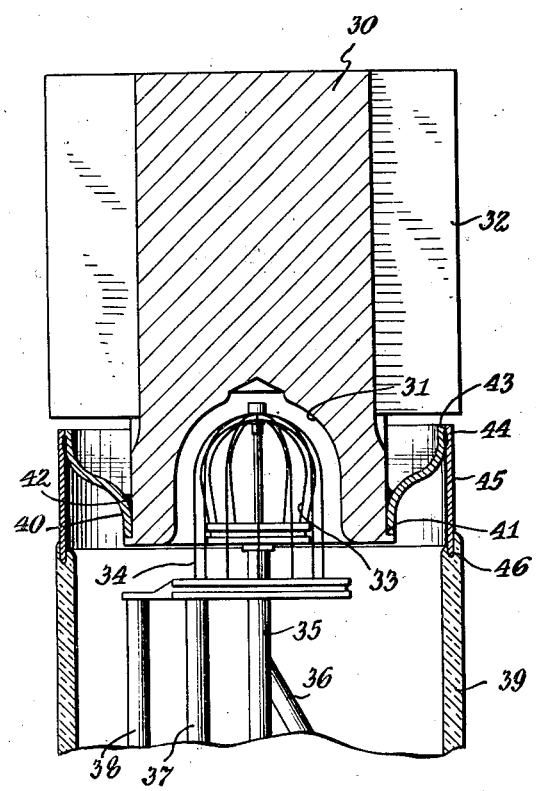
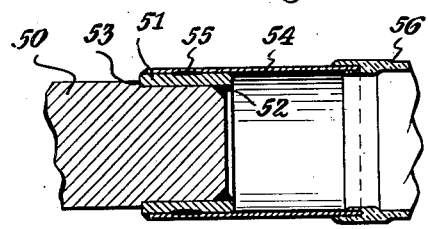
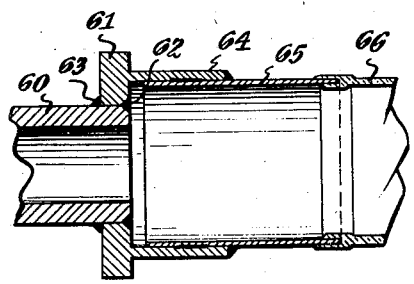
INVENTOR
W. J. KNOCHEL.
BY
ATTORNEY Patented Mar. 24, 1942

2,277,440

UNITED STATES PATENT OFFICE 2,277,440

GLASS-METAL CASING

William John Knochel, Irvington, N. J., assignor to Westinghouse Electric & Manufacturing Company, East Pittsburgh, Pa., a corporation of Pennsylvania Application January 10, 1941, Serial No. 373,930

9 Claims. (Cl. 250—27.5)

My invention relates to discharge devices and especially to the glass-to-metal seal of the electrode lead-ins of such discharge devices.

An object of the invention is to provide a vacuum-tight metal-to-glass seal that is especially rugged and will withstand a high temperature of operation of the device.

Another object of the invention is to permit the combination of copper conductors with a nickel-cobalt-iron alloy for sealing to the glass insulating portions of the discharge devices.

Other objects and advantages of the invention will be apparent from the following description and drawing in which:

Figure 1 is a view in cross-section of an X-ray device incorporating a preferred embodiment of my invention.

Figure 2 is a cross-section through a vacuum tube incorporating a still further modification of my invention.

Figures 3 and 4 are cross-sectional views illustrating still further modifications of the invention.

One of the oustanding inventions in regard to glass-to-metal seals for devices, especially discharge devices requiring a vacuum-tight seal between borosilicate glass and a metal, was the discovery of Howard Scott, described in Patent No. 2,062,335, issued December 1, 1936, that an alloy of 28% to 34% nickel, 5% to 25% cobalt, less than 1% manganese and the remainder iron, could be sealed vacuum-tight in a borosilicate glass. This alloy has an increasing commercial use, especially for the product sold under the trade name of "Kovar." This alloy normally permits a very rugged seal since it does not require the fine feather edge that was necessary with the copper of the prior art.

The advance of the electronic art in recent years, has required certain tubes to have both the rugged seal requiring the nickel-cobalt-iron alloy sealed to the borosilicate glass and yet requiring that the electrode connections or the electrode itself to be of copper. These tubes have also required that the connection between the nickel-cobalt-iron alloy and the copper be vacuum-tight.

The ordinary welding and soldering between the two metals was found to be unsatisfactory. Silver soldering was tried, but it was found that silver penetrated the pores of the nickel-cobalt-iron alloy and split it.

It is an object of my invention to provide a vacuum-tight connection between copper and the nickel-cobalt-iron alloy that is vacuum-tight and yet very rugged and capable of withstanding considerable heat.

In Figure 1 I have disclosed an X-ray tube having a casing 10 of borosilicate glass, enclosing a cathode 11 and a target comprising a plate of tungsten 12, inserted in a block of copper 13. This block of copper is massive and must withstand considerable heat of operation. In order to seal this block of copper to the glass, I first utilize a short sleeve 14 of a metal having a higher melting point than copper. This metal may be one of the iron group, particularly steel, such as cold-rolled or stainless steel, or nickel or a high temperature melting allow such as 60–70% Ni, 25–35% Cu, 1–3 Fe, .25–2% Mn sold under the trade name of Monel. This sleeve, at 15, is silver soldered to the reduced diameter portion 16 of this copper block.

This sleeve of steel or other high melting material can be seam-welded at 17 to a sleeve 18 of the nickel-cobalt-iron alloy. Because of the higher melting point than copper of the sleeve 14, the vacuum tightness of the joint between the sleeve 14 and the nickel-cobalt-iron alloy can be assured by copper brazing the sleeve at 19 to the alloy. The alloy may fit either to the exterior surface of the steel, or to the interior, as disclosed in the drawing. In manufacture, seam welding and brazing 17 and 19 are performed prior to silver soldering 15, as the latter is effected at a lower temperature than the other unions with the alloy sleeve 18. This nickel-cobalt-iron alloy is sealed vacuum-tight into the adjacent re-entrant portion 20 of the borosilicate glass and forms a rugged seal thereto. A thick copper electrode connection 21 is screw-threaded into the exposed end 16 of the electrode block 13. A space 22 intermediate the electrode connection 21 and the steel and nickel-cobalt-iron alloy allows a ready transfer of heat to the exterior of the device and this space may be fan-cooled if desired.

In Figure 2 is disclosed a discharge device, in which a solid block 30 is hollowed at one end 31 to form a discharge space. The block 30 has integral fins 32 thereon. Inserted in the hollowed out space 31 is a filament structure 33 in the form of a cage which is, in turn, surrounded by a grid 34, also in the form of a cage.

The two connections 35 and 36 to the cathode and also the grid connections 37 and 38, are sealed through the insulating portion 39 consisting of borosilicate glass. The problem which my invention solves is that of making a rugged seal between the solid copper block 30 and the insulating casing 39 of borosilicate glass. For the vacuum-tight connection to the copper block 30 I select a flared out short cylindrical portion 40 of metal having a higher melting point than copper, such as cold rolled or stainless steel, having its inner edge 41 closely fitting to the copper block 30. This inner edge is silver soldered, as indicated at 42, to the copper block. The outer flared out edge 43 is seam-welded at 44 to an enclosing cylinder 45 of the nickel-cobalt-iron alloy. These two metals are then copper brazed to one another. The other edge 46 of the nickel-cobalt-iron alloy is sealed into the borosilicate glass portion 39 of the device.

In Figure 3 I have described a still further modification of the invention in which the copper rod 50 has a cylindrical sleeve 51 of a metal of higher melting point than copper, such as cold rolled or stainless steel, silver soldered at 52 about its periphery and preferably this sleeve is slightly inset into the copper as illustrated at 53.

The outer sleeve 54 of nickel-cobalt-iron alloy is then seam-welded as illustrated at 55, to the steel and is in turn sealed to the borosilicate portion 56.

A still further modification is illustrated in Figure 4, where the hollow copper rod 60 has a steel ring 61 silver soldered at 62 and 63 to the exterior of the copper rod and this ring 61 has an extending cylinder portion 64 that is seam-welded to the outer surface of the nickel-cobalt-iron alloy cylinder 65, that is in turn sealed to the borosilicate glass cylinder 66.

The extent of the cylinder of steel or other high temperature resistance material between the copper and the nickel-cobalt-iron alloy depends upon whether electrical resistance or the transfer of heat is of the first consideration.

In Figure 1 the electrical connection 21 directly to the copper block 13 eliminates any consideration of the electric current passing through the steel and the nickel-cobalt-iron alloy.

It will be noted that in Figure 3 there is very little distance from the copper to the nickel-cobalt-iron alloy, and this structure can be utilized where the use of the steel should be at a minimum. On the other hand, if it is thought advisable to protect the nickel-cobalt-iron sleeve, then the enclosing steel sleeve 61, illustrated in Figure 4, could be utilized.

With all these figures, however, the connection from the copper through to the nickel-cobalt-iron alloy, provides a very sturdy and yet vacuum-tight construction capable of withstanding considerable heat.

It is apparent that many modifications may be made in the forms of my invention besides the embodiments illustrated and, accordingly, I desire only such limitations to be imposed upon my invention as is necessitated by the spirit and scope of the following claims.

I claim:

1. A discharge device having a vacuum-tight casing, a portion of said casing being of borosilicate glass, a metal member of an alloy of 28% to 34% nickel, 5% to 25% cobalt, less than 1% manganese, and the remainder iron sealed to said borosilicate glass, a metal member having a higher melting point than copper vacuum sealed to said alloy member, and an electrode structure connected to said last mentioned metal member.

2. A discharge device having a vacuum-tight casing, a portion of said casing being of borosilicate glass, a metal member of an alloy of 28% to 34% nickel, 5% to 25% cobalt, less than 1% manganese, and the remainder iron sealed to said borosilicate glass, a metal member having a higher melting point than copper welded to said alloy member and an electrode structure connected to said last mentioned metal member.

3. A discharge device having a vacuum-tight casing, a portion of said casing being of borosilicate glass, a metal member of an alloy of 28% to 34% nickel, 5% to 25% cobalt, less than 1% manganese, and the remainder iron sealed to said borosilicate glass, a metal member having a higher melting point than copper brazed to said alloy member, and an electrode structure connected to said last-mentioned metal member.

4. A discharge device having a vacuum-tight casing, a portion of said casing being of borosilicate glass, a metal member of an alloy of 28% to 34% nickel, 5% to 25% cobalt, less than 1% manganese, and the remainder iron sealed to said borocilicate glass, a metal member having a higher melting point than copper welded to said alloy member, and an electrode structure silver soldered to said last-mentioned metal member.

5. A discharge device having a vacuum-tight casing, a portion of said casing being of borosilicate glass, a sleeve of an alloy of 28% to 34% nickel, 5% to 25% cobalt, less than 1% manganese, and the remainder iron sealed to said borosilicate glass, a cylindrical metal member having a higher melting point than copper welded to said alloy sleeve, and an electrode structure silver soldered to said last-mentioned cylindrical metal member.

6. A discharge device comprising a vacuum-tight casing, a portion of said casing being of borosilicate glass, a sleeve of an alloy of 28% to 34% nickel, 5% to 25% cobalt, less than 1% manganese, and the remainder iron sealed to said borosilicate glass, a cylindrical steel member interfitting with said alloy sleeve and welded thereto, and a block of copper silver soldered to said steel member.

7. A discharge device having an interior metallic member and having a vacuum-tight casing for said member, a steel ring constituting a sleeve situated in part around a portion of said member and sealed thereto, thereby both confining radial expansion of said member and effecting a vacuum-tight seal therewith, said casing having a portion thereof in proximity to said ring composed of borosilicate glass, and a metallic part having substantially the same coefficient of expansion as said glass sealed thereto and to said ring with a vacuum-tight seal with respect to both.

8. A discharge device having an interior metallic member subject in use to high temperatures and expansion due to heat, a portion of said device comprising a glass container an edge whereof is directed toward said member, a metallic part having substantially the same coefficient of expansion as said glass sealed with a vacuum-tight seal to said edge of the glass container, and means interposed between said metallic part and member vacuum sealed with respect to both, said means having superior tensil strength over said metallic member to prevent expansion of said member from communicating to and expanding said metallic part.

9. A discharge device having an interior metallic member with a cylindrical end margin, said member being subject in use to high temperatures and expansion due to heat, a portion of said device comprising a glass container an edge whereof is cylindrical and in proximity to said cylindrical end margin of said metallic member, and a two-part vacuum-tight sealing means interposed between said cylindrical end margin and said glass edge, one of said parts comprising a cylindrical formation of steel having an end margin thereof overlapping said cylindrical end margin of the metallic member and preventing material radial expansion therein of said member, and the other of said parts comprising an alloy sleeve vacuum sealed to the steel part remote from the margin thereof overlapping the metallic member, said alloy sleeve being vacuum sealed at a margin thereof remote from the steel part to said edge of the glass container.

WILLIAM J. KNOCHEL.